(12) United States Patent
Gard et al.

(10) Patent No.: US 7,631,575 B2
(45) Date of Patent: Dec. 15, 2009

(54) ADJUSTABLE ROTARY LOCKING AND UNLOCKING DEVICE

(76) Inventors: Paul D. Gard, 7204 Kathleen NE., Alb., NM (US) 87110; Barton Brett Davis, 7608 Parkwood Dr. NW., Alb., NM (US) 87120

( * ) Notice: Subject to any disclaimer, the term of this patent is extended or adjusted under 35 U.S.C. 154(b) by 710 days.

(21) Appl. No.: 11/134,787

(22) Filed: May 17, 2005

(65) Prior Publication Data
US 2006/0260430 A1 Nov. 23, 2006

(51) Int. Cl.
*G05G 5/06* (2006.01)
(52) U.S. Cl. .................................................. 74/530
(58) Field of Classification Search ............. 74/527, 74/529, 534, 536, 543, 544, 551.1, 551.2, 74/551.3; 403/83, 84, 97, 107
See application file for complete search history.

(56) References Cited

U.S. PATENT DOCUMENTS

| 4,015,487 A | 4/1977 | Pfister | 74/813 L |
|---|---|---|---|
| 4,467,680 A | 8/1984 | Kettel | 82/36 A |
| 4,666,328 A | 5/1987 | Ryu | 403/92 |
| 4,709,454 A | 12/1987 | Barnes | 24/573.11 |
| 4,966,046 A | 10/1990 | Tagawa | 74/502.2 |
| 5,026,198 A | 6/1991 | Lin | 182/27 |
| 5,056,805 A | 10/1991 | Wang | 280/47.36 |
| 5,123,768 A * | 6/1992 | Franklin | 403/96 |
| 5,168,601 A * | 12/1992 | Liu | 16/445 |
| 5,222,412 A | 6/1993 | Nagano | 74/502.2 |
| 5,279,387 A | 1/1994 | Swiderski et al. | 182/27 |
| 5,551,745 A * | 9/1996 | Huang | 296/111 |
| 5,689,999 A | 11/1997 | Wiley et al. | 74/527 |
| 5,694,818 A * | 12/1997 | Nickipuck | 81/60 |
| 5,884,533 A | 3/1999 | Shyu | 74/527 |
| 5,988,012 A | 11/1999 | Arnoth | 74/527 |
| 6,196,568 B1 * | 3/2001 | Stevens | 280/304.1 |

* cited by examiner

*Primary Examiner*—Vicky A Johnson
(74) *Attorney, Agent, or Firm*—Paul D. Gard; Barton Brett Davis

(57) ABSTRACT

An improved adjustable rotary locking and unlocking device that utilizes a pushbutton to unlock teeth on a spring loaded hub drive that mesh within a swivel member. Once the hub drive and swivel member are disengaged by pressure on the pushbutton, the swivel member is freely moveable to any other position. Release of pressure on the pushbutton allows the teeth of the spring loaded hub to re-engage the teeth of the swivel member, thereby rigidly locking the device in place.

14 Claims, 5 Drawing Sheets

ADJUSTABLE ROTARY LOCKING AND UNLOCKING DEVICE

BACKGROUND OF THE INVENTION

1. Field of Invention

The present invention relates to locking and unlocking devices of a rotary nature whereby two members that are rotatable about a hub can be adjustably fixed in a variety of positions by the deployment of cog type teeth or locking pins.

2. Description of the Prior Art

There are numerous examples of rotary locking devices which provide the rotatable members to be adjustably fixed in a proscribed position and then unlocked to allow movement into another fixed position. These devices usually provide a locked position by using pins or gears and are subsequently unlocked by disengaging the pins or gears by depressing a spring loaded mechanism which when released causes the pins or teeth of the gears to engage their female counterpart thereby allowing the rotatable members to be repositioned in another locked position. There are many examples of such pin and cog designed devices.

U.S. Pat. No. 5,689,999 issued to Wiley, Gay, and Larkin Nov. 25, 1997 for an Adjustable Rotary Locking and Unlocking Apparatus. This example of such a device has a plurality of spring loaded pins in a hub that engage one at a time into a similarly sized plurality of holes spaced around the axis of another hub. The draw back of this design is that only one pin engages at a time thereby diminishing the strength of the locking device. Also, to achieve small increments of angulation of the two rotatable members requires a greater plurality of pins and holes, thereby increasing the cost and complexity of the device.

U.S. Pat. No. 5,056,805 issued to Chia-Ho Wang Oct. 15, 1991 for a Baby Stroller demonstrates a multipositional locking hub device that allows for the handle of the stroller the ability to be locked in a plurality of positions to accommodate more comfortable settings of the handles while pushing the stroller. This is achieved by allowing the mateable members to pivot around the hub mechanism through an arrangement of several interlocking gears, which are held in place by the tension of a single spring. The use of three gears with interlocking teeth allows for shearing force to come into play as the two primary external gears are offset by the intermediary gear.

U.S. Pat. No. 5,279,387 issued Jan. 18, 1994 to Swiderski and Seadler for an Articulated Ladder Assembly. The Swiderski and Seadler invention utilizes pivotable hubs that lock and unlock to angularly adjust the segmented ladder sections into different folded or extended configurations. This variability of positions is provided by the usage of interlocking teeth on the flat surface of round hubs held in tension by the use of a single coil spring in conjunction with a single disk spring. This locking hub mechanism does not allow for fine angular variations of locked settings.

What is needed is an adjustable rotary locking and unlocking device that is designed to have greater strength and greater range of angular variability in the locked mode with pushbutton ease of operation.

SUMMARY OF THE INVENTION

In accordance with the present invention a pushbutton actuated rotary locking and unlocking apparatus comprises two rotatable members around a mateable circular gear mechanism utilizing two gears and four springs, which all gear teeth can interlock by spring tension and be unlocked by pushbutton activation.

Therefore, it is an object of the present invention to have a finely adjustably fixed locking hub that will provide for locked positions around the hub when the arc is equally divided into various degrees providing whole numbers.

Another object of the present invention is to improve the strength of such a device in the locked position by utilizing teeth that interlockably engage around the circumference of the hubs of the two axial members.

A still further object of the invention is to reduce the angular "creep" found in other inventions whether made with pins or cogged teeth, when torsional load is placed on the members in a locked position.

Another object of the present invention is to simplify the manufacturing and assembly of such a device by using less parts.

DESCRIPTION OF THE PREFERRED EMBODIMENT

Figure 1:
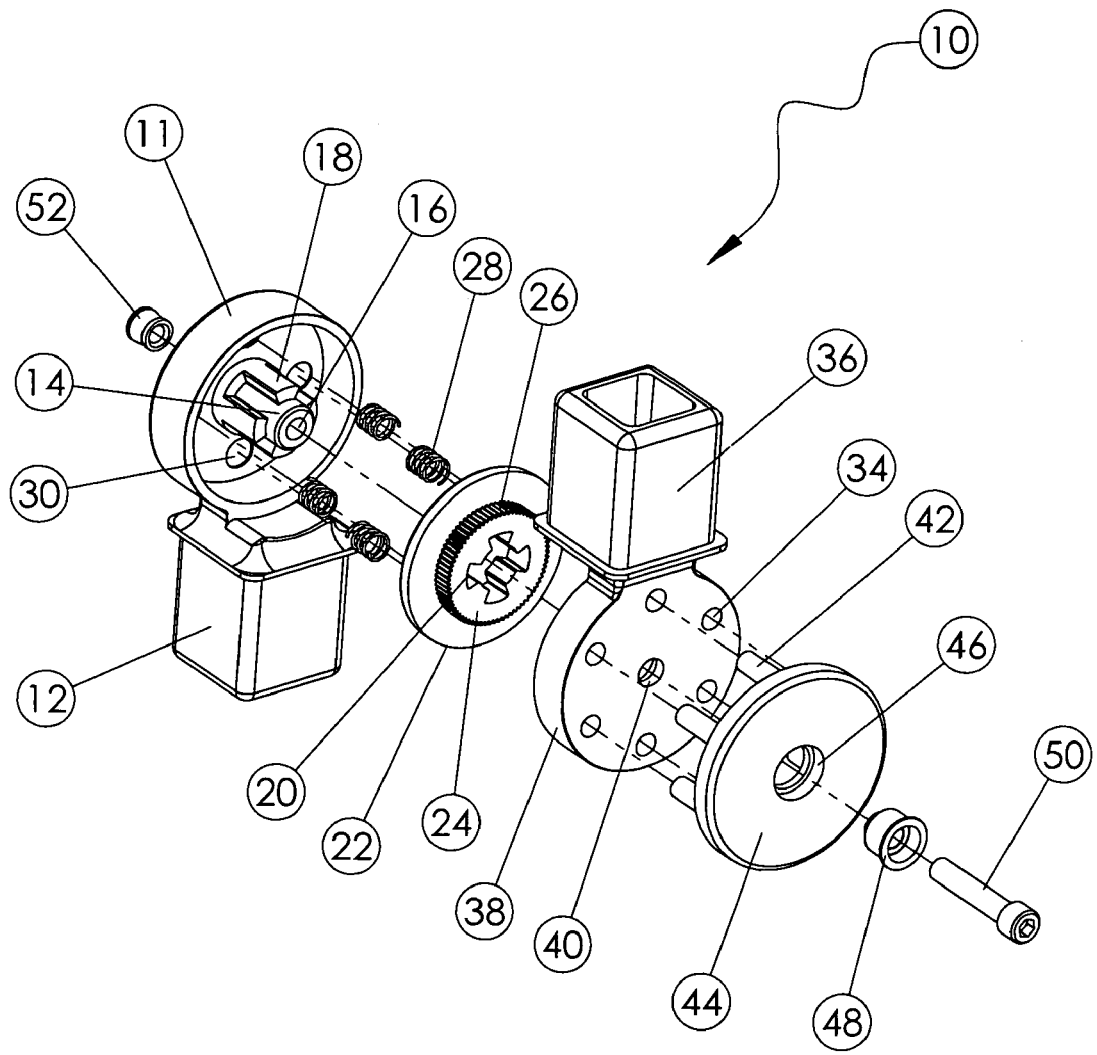
FIG. 1 is an exploded pictorial view of the invention showing the two axially opposed members, the four compression springs, the hub drive, the pushbutton spider plate, hub screw bushing, the press-in threaded insert, and hexagonal hub screw.
Figure 2:
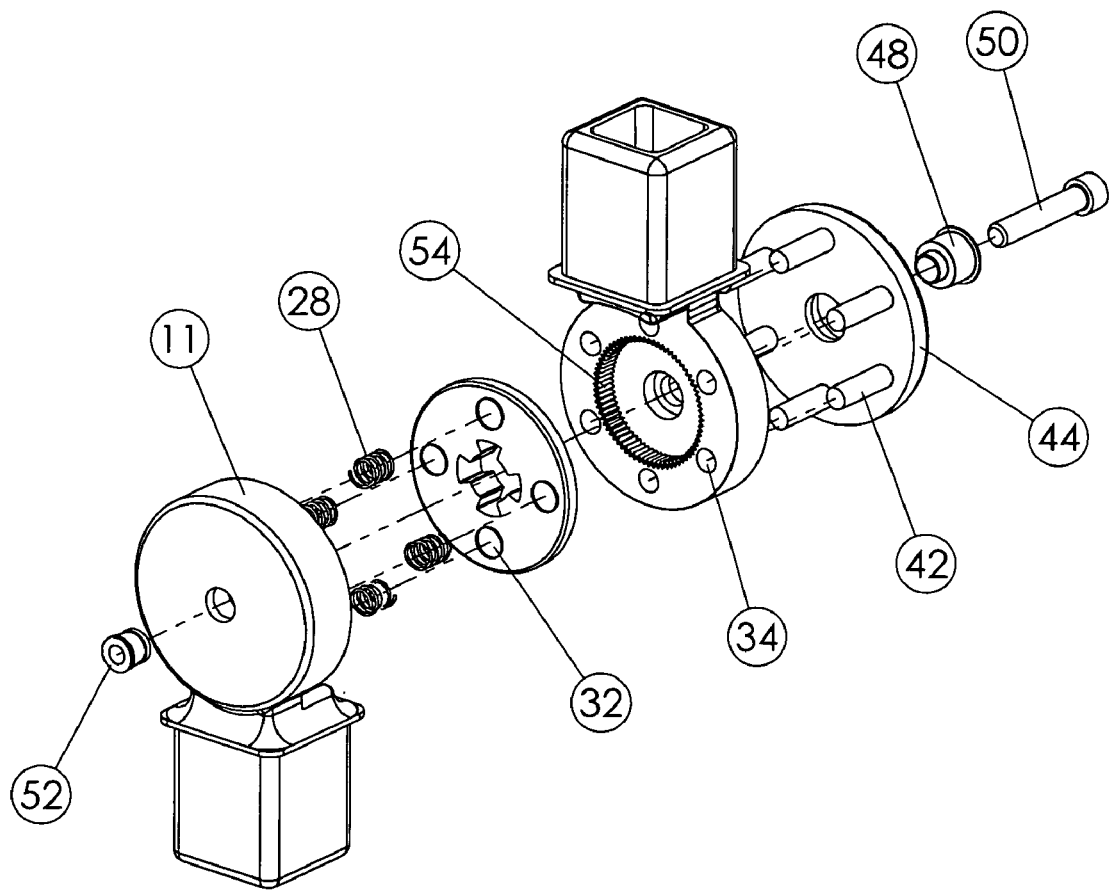
FIG. 2 is an opposite exploded pictorial view of the invention showing the two axially opposed members, the four compression springs, the hub drive, the pushbutton spider plate, the hub screw bushing, the press-in threaded insert, and hexagonal hub screw.

The adjustable rotary locking and unlocking device (10) of the present invention as shown in FIGS. 1 through 5 has a circular disk-shaped hub receiver member (11) which is attached to a first extension member (12) of any length, shape, or dimension. The hub receiver member (11) has a cylindrical shaped central hub projection (14) with a central pass-through aperture (16). The central pass-through aperture (16) is surrounded by four equidistant qruadrilaterally shaped projections (18) which slidably penetrate and lock into matching quadrilaterally shaped cutouts (20). The identical quadrilaterally shaped cutouts (20) are centrally located and penetrate through a flat circular hub drive (22) which has a raised circular plateau (24) with evenly spaced teeth projections (26) around the outer surface of the raised circular plateau (24). Four same sized compression springs (28) fit into four same sized indentions (30) on the first hub receiver member (11) which are placed equidistantly around the four quadrilaterally shaped projections (18). Also, the same sized springs (28) are secured in place by similar four same sized hub drive indentions (32) found on the flat surface of the circular hub drive (22). The evenly spaced teeth projections (26) of the raised circular plateau (24) matebly connect to evenly spaced teeth projections (54) which are arranged on the inner rounded surface of the hub swivel member (38).

The hub swivel member (38) is connected to a second extension member (36) which may also be formed of any length, shape, or dimension. The hub swivel member (38) has a central hub swivel member pass-through aperture (40) which is surrouded equidistantly by six other equal sized pass-through apertures (34) that accommodate the passage of six equal sized push button spider plate prongs (42) which are attached to a circular push button spider plate (44). The circular push button spider plate (44) has a central spider plate pass-through aperture (46) where a spider plate screw bushing (48) is seated. A spider plate screw (50) passed through the spider plate screw bushing (48), through the circular push button spider plate (44), through the hub swivel member (38), through the flat circular hub drive (22), through the hub receiver member (11) and is threadedly fastened into a circular threaded metal insert (52) that is attached into the outside of surface of the hub receiver member (11). This provides a complete adjustable rotary locking and unlocking device (10).

The adjustable rotary locking and unlocking device (10) of the present invention may be made of materials such as: polyethelene, polypropylene, polystyrene, poly terephelates, nylon, glass impregnated nylon, and copolymers thereof as well as any type of metal or metallurgical compounds.

Figure 3:
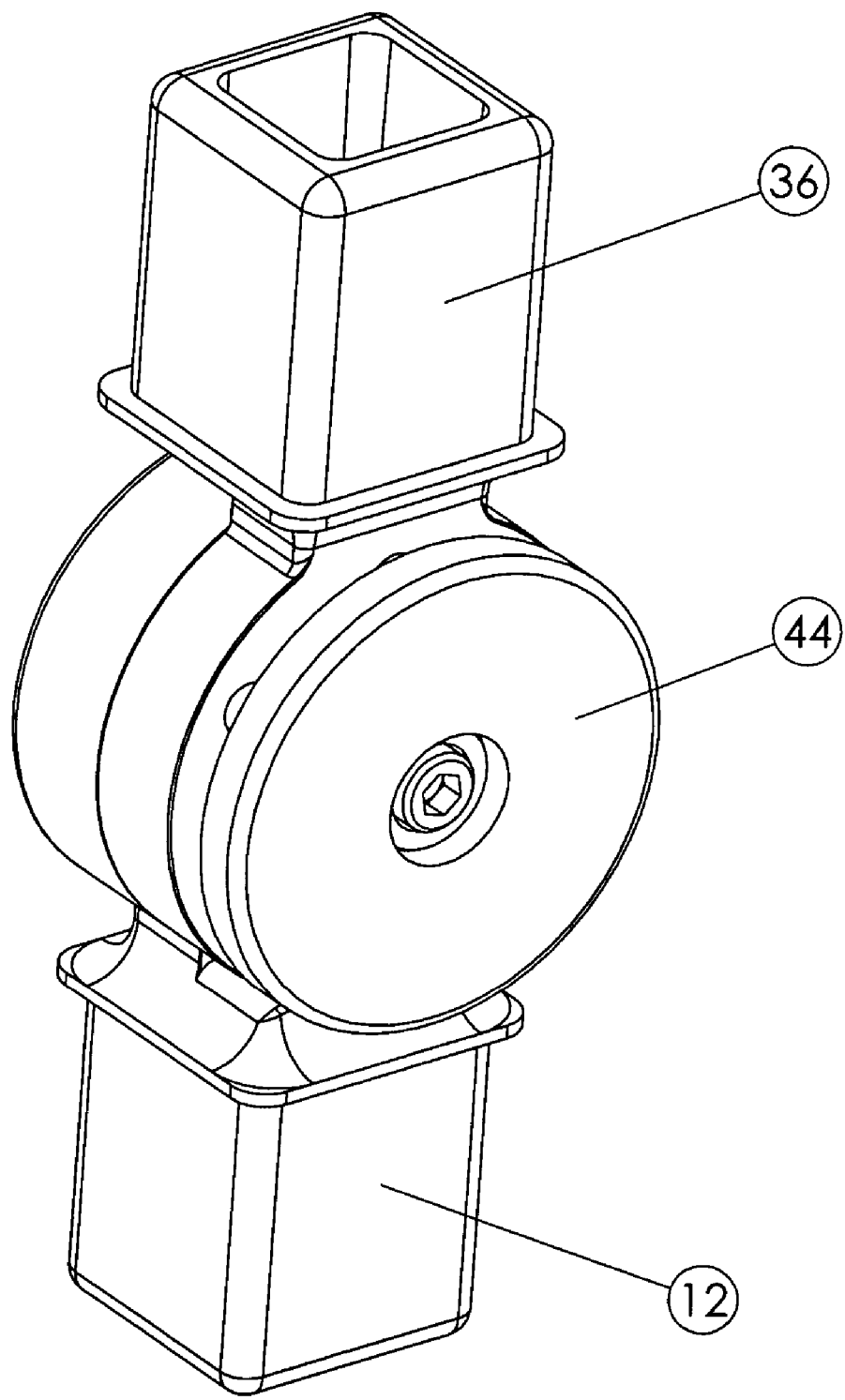
FIG. 3 is an isometric fully assembled view showing the pushbutton spider plate, hexagonal hub screw, and the two axially opposed members.
Figure 4:
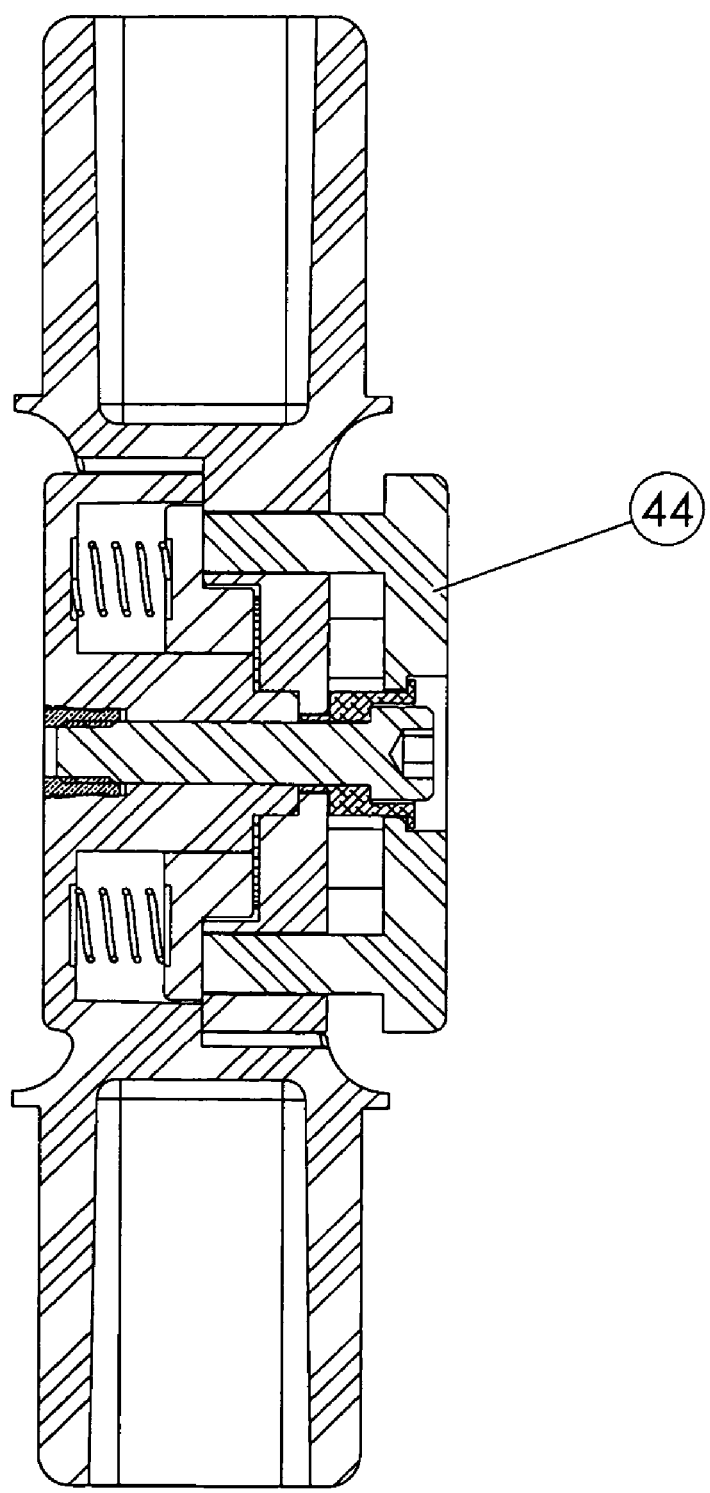
FIG. 4 is a sectional view of the invention.
Figure 5:
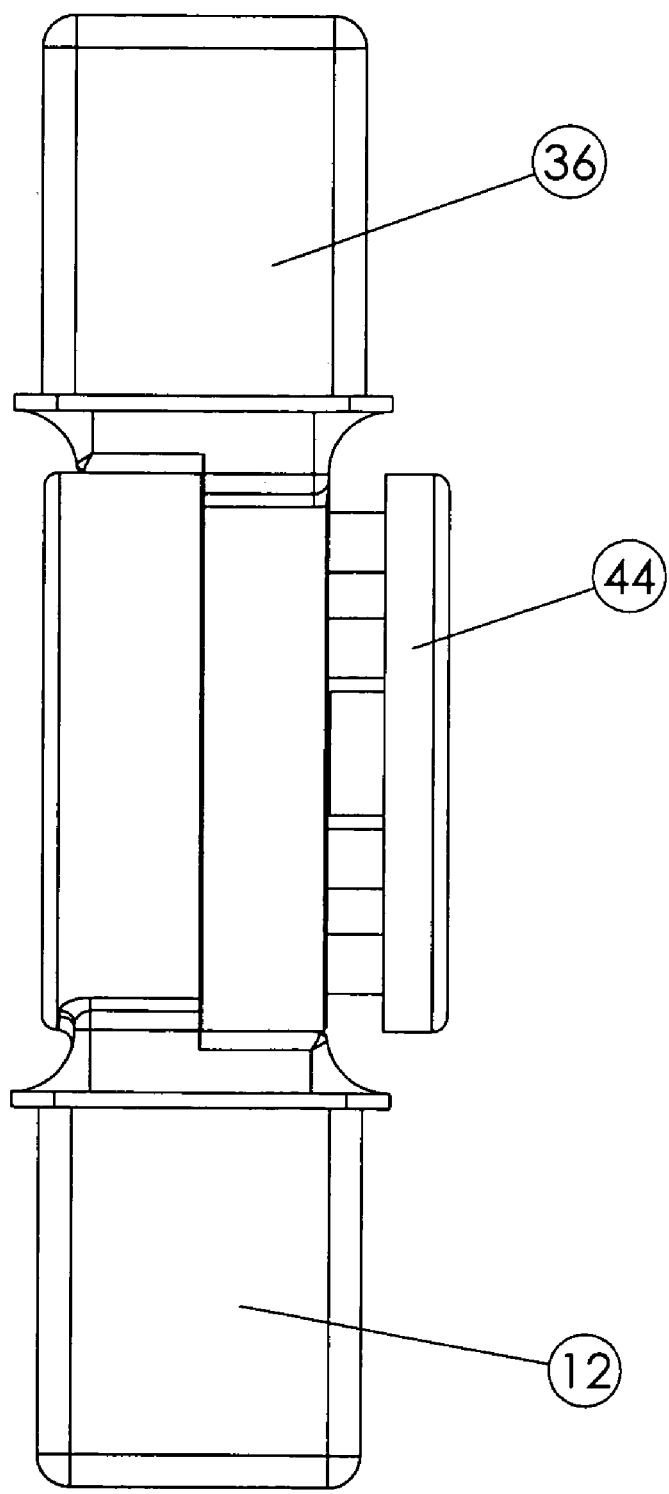
FIG. 5 is a frontal view of the invention.

Operation of the improved rotary locking and unlocking device is easy and straight forward. Grasp the device, as shown in FIGS. 3, 4, and 5 and apply digital pressure to the circular pushbutton spider plate (44) which disengages the evenly spaced teeth projections (26) of the flat circular hub drive (22) from the evenly spaced teeth projections (54) of the second circular shaped hub swivel member (38). The second circular shaped swivel member (38) is then able to be moved to any desired position. Once the digital pressure on the circular pushbutton spider plate (44) is released, the pressure exerted onto the surface of the hub drive (22) by the compression springs (28) causes the evenly spaced teeth projections (26) and (54) to re-engage thereby locking the improved adjustable rotary locking and unlocking device (10) in a new position.

Accordingly, it can be seen that, according to the invention, I have provided a new rotary locking and unlocking device which allows for more rigidity, strength, precision of angulation, no angular creep, simplicity, ease of operation, and ease of manufacture.

Although the description above contains many specifications, these should not be construed as limiting the scope of the invention, but merely providing illustrations of the presently preferred embodiments of the invention. Various other embodiments and ramifications are possible within its scope. For example the material used to build the device can be of metal, plastic, vinyl, synthetic, or composite. Also the spring arrangement could be multiple or single. The length of the receiver member or swivel member can be of any length.

Thus the scope of the invention should be determined by the approved claims and their legal equivalents, rather than by the examples given.

What is claimed is:

1. An adjustable locking and unlocking device comprising:
   (a) a circular threaded metal insert;
   (b) a hub receiver member comprising inner and outer surfaces, said hub receiver member attached to a first extension member, said inner surface of said hub receiver member having a cylindrical shaped central hub projection with a central pass-through aperture, said cylindrical shaped hub projection surrounded by four equidistant quadrilaterally shaped projections;
   (c) a circular hub drive comprising a flat first side and a raised circular plateau second side, said raised circular plateau second side having an outside surface, a plurality of evenly spaced outer teeth projections surrounding said outside surface of said raised circular plateau;
   (d) a hub swivel member comprising a prescribed number of equal sized pass-through apertures, said hub swivel member attached to a second extension member, said hub swivel member having an inside surface and outside surface, a plurality of evenly spaced inner teeth projections surrounding said inside surface of said hub swivel member;
   (e) a pushbutton spider plate comprising a plurality of equal sized push button spider plate prongs;
   (f) a spider plate screw bushing;
   (g) a spider plate screw;
   (h) a plurality of compression springs; wherein said first extension member can be rotatably positioned and fixed in relation to said second extension member.

2. An adjustable rotaly locking and unlocking device according to claim 1:
   wherein said circular threaded metal insert is mateably attached to said central pass-through aperture of said hub receiver member.

3. An adjustable rotaly locking and unlocking device according to claim 1:
   wherein said hub receiver member is a circular cup shape.

4. An adjustable rotary locking and unlocking device according to claim 1:
   wherein said inner surface of said hub receiver member comprises multiple circular indentions.

5. An adjustable rotary locking and unlocking device according to claim 1:
   whererin said flat first side of said circular hub drive comprises multiple circular indentions.

6. An adjustable rotary locking and unlocking device according to claim 1:
   wherein said identical quadrilaterally shaped cutouts are centrally located on said flat circular hub drive.

7. An adjustable rotary locking and unlocking device according to claim 1:
   wherein said hub swivel member is a circular dish shape.

8. An adjustable rotary locking and unlocking device according to claim 1:
   wherein said hub swivel member has six equal sized pass-through aperture.

9. An adjustable rotary locking and unlocking device according to claim 1:
   wherein said hub swivel member has a central pass-through aperture.

10. An adjustable rotary locking and unlocking device according to claim 1:
    wherein said circular push button spider plate has a central spider plate pass-through aperture.

11. An adjustable rotary locking and unlocking device according to claim 1:
    wherein said central spider plate pass-through aperture has a small inner diameter lip.

12. An adjustable rotary locking and unlocking device according to claim 1:
    wherein said spider plate screw bushing is nipple shaped.

13. An adjustable rotary locking and unlocking device according to claim 1:
    wherein said spider plate screw bushing has a central pass-through aperture.

14. An adjustable rotary locking and unlocking device according to claim 1:
    wherein said spider plate screw passes through said spider plate screw bushing, through said circular push button spider plate, through hub swivel member, through said flat circular hub drive, through said hub receiver member and threadedly fastens to said circular threaded metal insert.

* * * * *